United States Patent
Matute Arribas et al.

(10) Patent No.: US 11,057,672 B2
(45) Date of Patent: Jul. 6, 2021

(54) ADAPTIVE PRECISION FOR REPORTING CONSUMPTION OF STREAMED CONTENT

(71) Applicant: TELEFONAKTIEBOLAGET LM ERICSSON (PUBL), Stockholm (SE)

(72) Inventors: Victoria Matute Arribas, Achen (DE); Thorsten Lohmar, Aachen (DE); Lukas Ruge, Herzogenrath (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 88 days.

(21) Appl. No.: 15/767,947

(22) PCT Filed: Oct. 13, 2015

(86) PCT No.: PCT/EP2015/073677
§ 371 (c)(1),
(2) Date: Apr. 12, 2018

(87) PCT Pub. No.: WO2017/063677
PCT Pub. Date: Apr. 20, 2017

(65) Prior Publication Data
US 2018/0310056 A1 Oct. 25, 2018

(51) Int. Cl.
*H04N 21/442* (2011.01)
*H04W 24/10* (2009.01)
(Continued)

(52) U.S. Cl.
CPC ... *H04N 21/44204* (2013.01); *H04L 41/0816* (2013.01); *H04L 43/06* (2013.01);
(Continued)

(58) Field of Classification Search
CPC ....... H04N 21/44204; H04W 28/0289; H04W 4/06; H04W 24/10; H04L 67/22; H04L 65/4076; H04L 43/06; H04L 41/0816
(Continued)

(56) References Cited

U.S. PATENT DOCUMENTS

| | | | |
|---|---|---|---|
| 7,743,183 B2 * | 6/2010 | Virdi | H04L 29/06027 365/189.05 |
| 2002/0073238 A1 * | 6/2002 | Doron | H04L 65/605 709/246 |
| 2011/0138431 A1 * | 6/2011 | Cedervall | H04N 21/2385 725/109 |

(Continued)

FOREIGN PATENT DOCUMENTS

| | | |
|---|---|---|
| EP | 2568669 A1 | 3/2013 |
| WO | 2012175145 A1 | 12/2012 |
| WO | 2013127423 A1 | 9/2013 |

OTHER PUBLICATIONS

International Search Report and Written Opinion issued in Application No. PCT/EP20151073677 dated Jun. 14, 2016, 11 pages.
(Continued)

*Primary Examiner* — Kwang B Yao
*Assistant Examiner* — Syed M Bokhari
(74) *Attorney, Agent, or Firm* — Patent Portfolio Builders, PLLC

(57) ABSTRACT

A node (200) of a communication network determines a precision to be applied for reporting of consumption of streamed content. The node (200) sends configuration information (304) indicating the precision towards a plurality of client devices (10). After receiving reports of consumption (308) of the streamed content from at least some of the client devices (10), the node (200) adapts the precision to be applied for said reporting of consumption of the streamed content and sends further configuration information indicating the adapted precision towards the client devices (10).

16 Claims, 10 Drawing Sheets

(51) Int. Cl.
*H04L 12/24* (2006.01)
*H04L 12/26* (2006.01)
*H04L 29/06* (2006.01)
*H04L 29/08* (2006.01)
*H04W 4/06* (2009.01)
*H04W 28/02* (2009.01)

(52) U.S. Cl.
CPC .......... *H04L 65/4076* (2013.01); *H04L 67/22* (2013.01); *H04W 4/06* (2013.01); *H04W 24/10* (2013.01); *H04W 28/0289* (2013.01)

(58) Field of Classification Search
USPC ........................................ 370/230, 235, 312
See application file for complete search history.

(56) References Cited

U.S. PATENT DOCUMENTS

| | | | | |
|---|---|---|---|---|
| 2012/0236776 | A1* | 9/2012 | Zhang | H04W 36/0007 370/312 |
| 2013/0294321 | A1 | 11/2013 | Wang et al. | |
| 2014/0269314 | A1* | 9/2014 | Ozer | H04L 47/25 370/235 |
| 2014/0304377 | A1* | 10/2014 | Andersson | H04L 65/1083 709/219 |
| 2014/0372624 | A1* | 12/2014 | Wang | H04L 69/18 709/231 |
| 2015/0012929 | A1* | 1/2015 | Huber | H04N 21/64322 725/14 |
| 2015/0124692 | A1* | 5/2015 | Walker | H04L 5/0044 370/312 |
| 2016/0373546 | A1* | 12/2016 | Lotfallah | H04L 65/4084 |

OTHER PUBLICATIONS

3GPP, 3rd Generation Partnership Project; Technical Specification Group Services and System Aspects; Multimedia Broadcast/Multicast Service (MBMS); Protocols and codecs (Release 13), 3GPP TS 26.346, V13.2.0, Sep. 2015, 226 pages.

Ericsson, "Mi-MooD: Discussion and Proposals for Consumption Reporting"; 3GPP TSG-SA4 MBS, S4-AHI477, Sep. 30, 2014, 4 pages.

Qualcomm Incorporated, "Mi-MooD: MBMS Service Consumption Reporting"; 3GPP TSG-SA4 #78, S4-140329, Apr. 7-11, 2014; Kista, Sweden, 4 pages.

Office Action issued in corresponding EP Application No. 15784598.3; dated Sep. 13, 2018; 05 pages. All references cited therein have been previously made of record.

Office Action issued in corresponding EP Application No. 15784598.3; dated Mar. 4, 2019; 04 pages. All references cited therein have been previously made of record.

* cited by examiner ived, e.g., in the form of a non-transitory storage medium,
which comprises program code to be executed by at least

ADAPTIVE PRECISION FOR REPORTING CONSUMPTION OF STREAMED CONTENT

CROSS REFERENCE TO RELATED APPLICATION

This application is a 35 U.S.C. § 371 National Stage of International Application No. PCT/EP2015/073677, filed Oct. 13, 2015, designating the United States, the disclosure of which is incorporated by reference.

TECHNICAL FIELD

The present invention relates to methods for streaming content and to corresponding devices.

BACKGROUND

In communication networks, such as cellular networks as specified by 3GPP ($3^{rd}$ Generation Partnership Project) it is known to use multicast or broadcast transmissions for the purpose of delivering streamed content to client devices. For example, the content may be streamed on the basis of the MBMS (Multimedia Broadcast Multicast Service) as specified by 3GPP TS 23.246 V13.2.0 (2015-09).

The delivery using broadcast or multicast transmissions may be combined with delivery using unicast transmissions. For example, unicast transmissions may be applied for file repair functionalities or for consumption reporting. Further, unicast transmissions may also be used for the delivery of the content itself. For example, if a client device is outside of a broadcast coverage region, the client device may utilize unicast transmissions for receiving the content.

Further, it is also known to switch between utilizing multicast transmissions or unicast transmissions depending on reported consumption of the streamed content. In this way, unicast transmissions may be utilized for the delivery if there is only a small number of client devices receiving the content, and multicast delivery may be utilized for the delivery if the reported consumption exceeds a threshold. When initiating consumption reporting, a node referred to as BM-SC (Broadcast Multicast Service Centre) may set a precision of the consumption reporting by specifying a periodicity at which the client device performs consumption reporting and also a percentage of client devices which should perform the consumption reporting, as for example described in 3GPP TS 26.346 V13.2.0 (2015-09), Section 9.4A.

However, in some scenarios the precision set by the BM-SC may result in unsatisfactory performance. For example, if there are only a few client devices in a considered service area, the number of consumption reports may be too low for accurately switching between unicast and multicast delivery. On the other hand, if there is a larger number of devices in the service area, the same periodicity of consumption reporting may cause excessive traffic load and power consumption by the reporting client devices.

Accordingly, there is a need for techniques which allow for efficiently reporting consumption of streamed content.

SUMMARY

According to an embodiment of the invention, a method of streaming content is provided. According to the method, a node of a communication network determines a precision to be applied for reporting of consumption of streamed content. The node sends configuration information indicating the precision towards a plurality of client devices. After receiving reports of consumption of the streamed content from at least some of the client devices, the node adapts the precision to be applied for said reporting of consumption of the streamed content and sends further configuration information indicating the adapted precision towards the client devices.

According to a further embodiment of the invention, a method of streaming content is provided. According to the method, a client device receives configuration information indicating a precision to be applied for reporting of consumption of streamed content. The client device receives the streamed content and sends one or more reports of consumption of the streamed content in accordance with the indicated precision. Further, the client device receives further configuration information indicating an adapted precision to be applied for reporting of consumption of the streamed content. The client device continues to receive the streamed content and sends one or more reports of consumption of the streamed content in accordance with the indicated adapted precision.

According to a further embodiment of the invention, a node for a communication network is provided. The node is configured to determine a precision to be applied for reporting of consumption of streamed content. Further, the node is configured to send configuration information indicating the precision towards a plurality of client devices. Further, the node is configured to, after receiving reports of consumption of the streamed content from at least some of the client devices, adapt the precision to be applied for said reporting of consumption of the streamed content and send further configuration information indicating the adapted precision towards the client devices.

According to a further embodiment of the invention, a client device is provided. The client device is configured to receive configuration information indicating a precision to be applied for reporting of consumption of streamed content. Further, the client device is configured to receive the streamed content and send one or more reports of consumption of the streamed content in accordance with the indicated precision. Further, the client device is configured to receive further configuration information indicating an adapted precision to be applied for reporting of consumption of the streamed content. Further, the client device is configured to continue to receive the streamed content and send one or more reports of consumption of the streamed content in accordance with the indicated adapted precision.

According to a further embodiment of the invention, a computer program or computer program product is provided, e.g., in the form of a non-transitory storage medium, which comprises program code to be executed by at least one processor of a node for a communication network. Execution of the program code causes the node to determine a precision to be applied for reporting of consumption of streamed content. Further, execution of the program code causes the node to send configuration information indicating the precision towards a plurality of client devices. Further, execution of the program code causes the node to, after receiving reports of consumption of the streamed content from at least some of the client devices, adapt the precision to be applied for said reporting of consumption of the streamed content and send further configuration information indicating the adapted precision towards the client devices.

According to a further embodiment of the invention, a computer program or computer program product is provided, e.g., in the form of a non-transitory storage medium, which comprises program code to be executed by at least one processor of a client device. Execution of the program code causes the client device to receive configuration information indicating a precision to be applied for reporting of consumption of streamed content. Further, execution of the program code causes the client device to receive the streamed content and send one or more reports of consumption of the streamed content in accordance with the indicated precision. Further, execution of the program code causes the client device to receive further configuration information indicating an adapted precision to be applied for reporting of consumption of the streamed content. Further, execution of the program code causes the client device to continue to receive the streamed content and send one or more reports of consumption of the streamed content in accordance with the indicated adapted precision.

Details of such embodiments and further embodiments will be apparent from the following detailed description of embodiments.

DETAILED DESCRIPTION OF EMBODIMENTS

Figure 1:
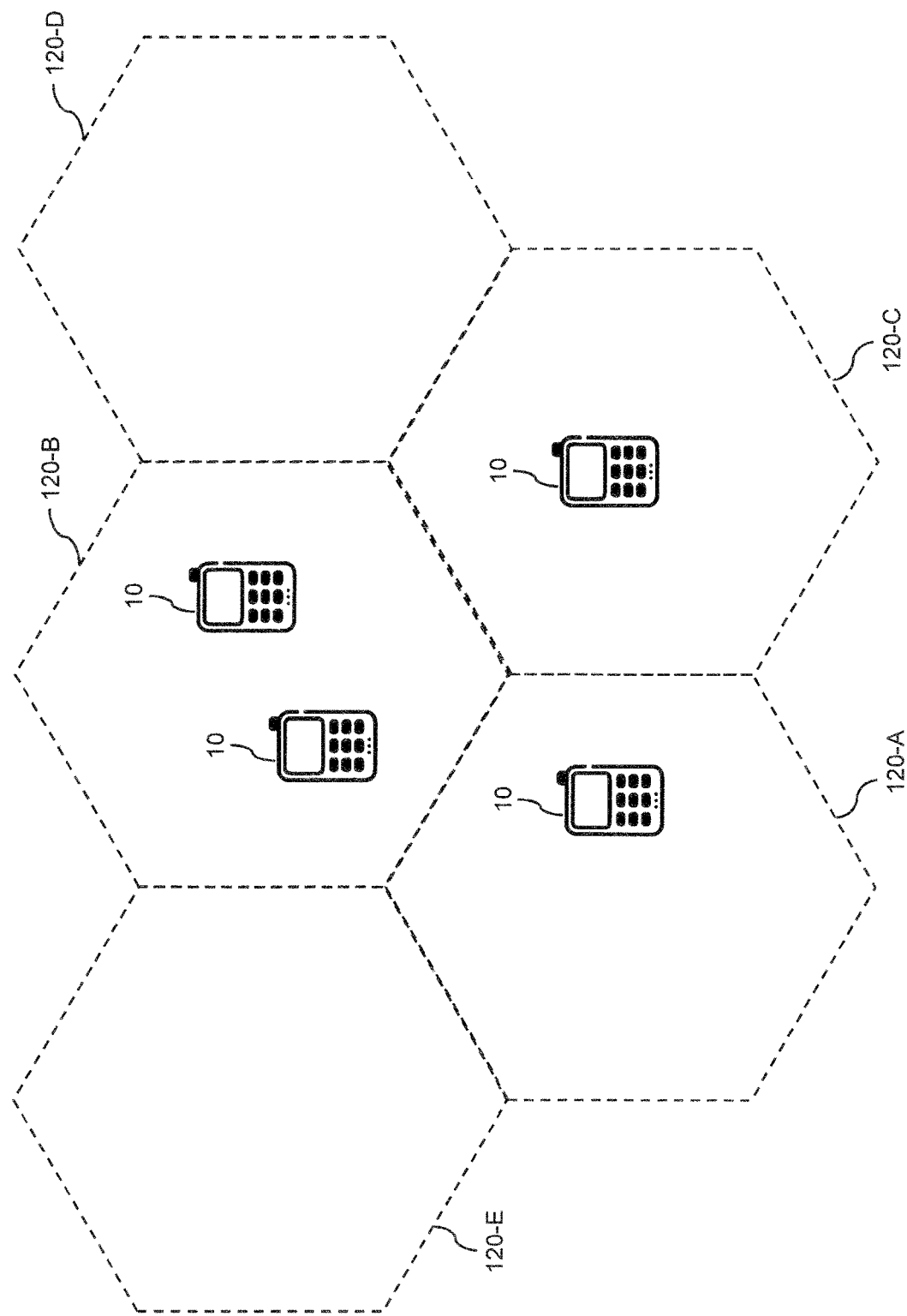
FIG. 1 schematically illustrates a communication network system for implementing streaming of content according to an embodiment of the invention.

In the following, concepts in accordance with exemplary embodiments of the invention will be explained in more detail and with reference to the accompanying drawings. The illustrated embodiments relate to streaming of content in a communication network. The communication network is assumed to enable delivery of streamed content to one or more client devices, using a multicast transmission mode (in the following also referred to as multicast delivery) or a unicast transmission mode (in the following also referred to as unicast delivery). For this purpose, such client device may be connected through a radio interface to the communication network. The radio interface may for example be based on a cellular radio technology, e.g., the LTE technology. As used herein, the "multicast transmission mode" refers to a transmission mode in which a single transmission is addressed to multiple recipients, which also includes the option of broadcast transmission to all recipients in a certain coverage area. The multicast transmission mode may for example be based on the MBMS technology. The "unicast transmission mode" refers to a transmission mode in which a transmission is addressed to only one recipient. The unicast transmission mode may for example be based on HTTP as specified in IETF RFC 7230 (June 2014) or protocols derived therefrom.

In the illustrated concepts, a node of the communication network configures reporting of consumption of the streamed content by the client devices. This is accomplished in an adaptive manner. That is to say, after initial configuration of a precision applied for the reporting and receiving at least some reports of the consumption, the precision is adapted while continuing the delivery of the streamed content. The precision may thus be adapted in dynamic manner, based on the received reports. Further, the precision may be adapted individually for certain service areas or even for individual client devices.

In the illustrated examples, it is assumed that the precision of consumption reporting is defined by a frequency at which a given client device periodically sends the reports of consumption and a sample percentage defining a subset of client devices which should send the reports, similar to as specified in 3GPP TS 23.246 V13.2.0. The adaptation of the precision may be performed depending on a density of the client devices receiving the streamed content as estimated based on the received reports and optionally further information, such as client devices leaving or entering the service area or a resizing of the service area. The density estimated based on the reports may be utilized for switching between unicast delivery of the streamed content (e.g., using HTTP request/response mechanisms) and multicast delivery of the streamed content (e.g., using MBMS). In such cases, the precision may also be adapted depending on the deviation of the estimated density from a threshold defined for switching between the unicast delivery and the multicast delivery. Such threshold may for example be defined by an operator of the communication network.

In the illustrated concepts, the precision may thus be flexibly set to suit conditions in the communication network. This may be accomplished individually per service area or even individually per client device (or category of client device). In some scenarios the adaptation of the precision may even involve temporal suspension of consumption reporting in one or more service areas.

Accordingly, when there is a higher probability that a switch between unicast delivery and multicast delivery is needed, the precision may be adapted in such a way that the reports of consumption are sent more frequently and/or by a higher percentage of client devices. Further, if the service area is large and a high number of client devices are located in the service area, the precision can be reduced since the high number of client devices compensates for a less frequent reporting or a lower percentage of reporting client devices. Similarly, individual adaptation per service area may allow for using a low precision in a region of low interest (where only a few client devices are located). Further, a low precision may also be applied in regions of very high interest, e.g., inside a stadium. Further, in some regions it may also be useful to adapt the precision in a time-dependent manner, e.g., depending on the time of the day and/or day of the week.

FIG. 1 schematically illustrates an exemplary scenario assuming that the communication network is a cellular network, e.g., based on the LTE radio technology. Specifically, FIG. 1 illustrates a plurality of cells 120-A, 120-B, 120-C, 120-D, 120-E of the cellular network and a plurality of client devices 10, also referred to as UE (user equipment).

In these cells 120-A, 120-B, 120-C, 120-D, 120-E, the streamed content may be delivered to the client devices 10 by unicast transmissions individually addressed to a certain client device 10, or by multicast transmissions addressed to a plurality of the client devices 10. In the following explanations it will be assumed that the multicast transmissions are MBMS transmissions addressed to all the client devices 10. A service area for the MBMS transmissions may be formed by one or more of the cells 120-A, 120-B, 120-C, 120-D, 120-E, e.g., as a MBSFN (Multicast Broadcast Single Frequency Network) area. One or more service areas for the MBMS transmissions may be configured depending on the availability of radio resources and other service requirements. For example, a single service area could be formed of the cells 120-A, 120-B, 120-C. Further, a first service area could be formed of the cells 120-A and 120-B, and a second service area could be formed of the cells 120-C and 120-D. As can be seen, the such service areas may have different densities of client devices 10. For example, the service area formed of the cells 120-A, 120-B, 120, C would have a density of 1.33 client devices per cell, the service area formed of the cells 120-A and 120-B would have a density of 1.5 client devices per cell, and the service area formed of the cells 120-C and 120-D would have a density of 0.5 client devices per cell. Here, it should be understood that the illustrated scenario mainly serves for purposes of explanation, and that more realistic scenarios may involve service areas of larger size, i.e., formed of more cells, and/or larger numbers of client devices 10.

Figure 2:
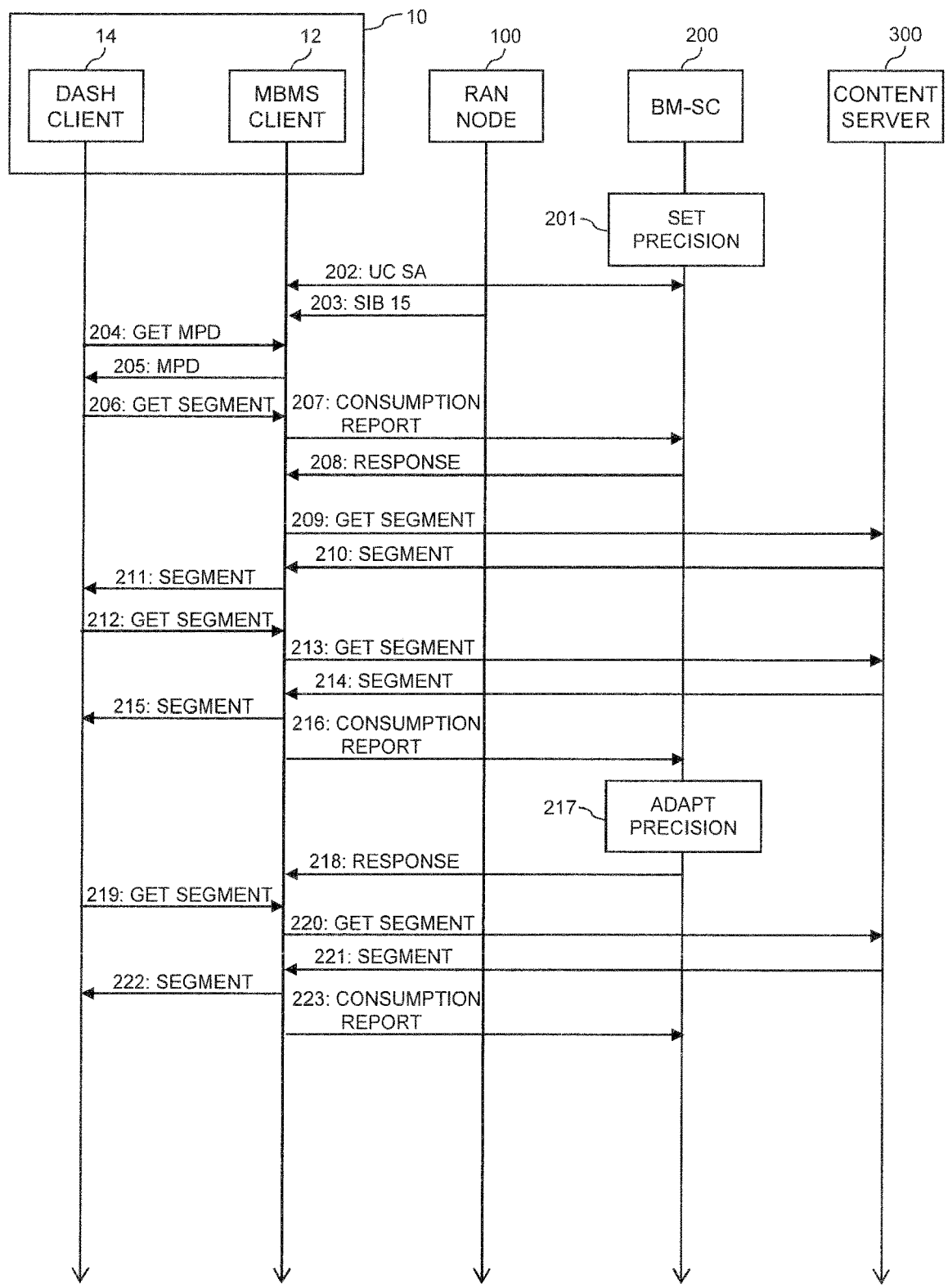
FIG. 2 shows an example of processes according to an embodiment of the invention.
Figure 3:
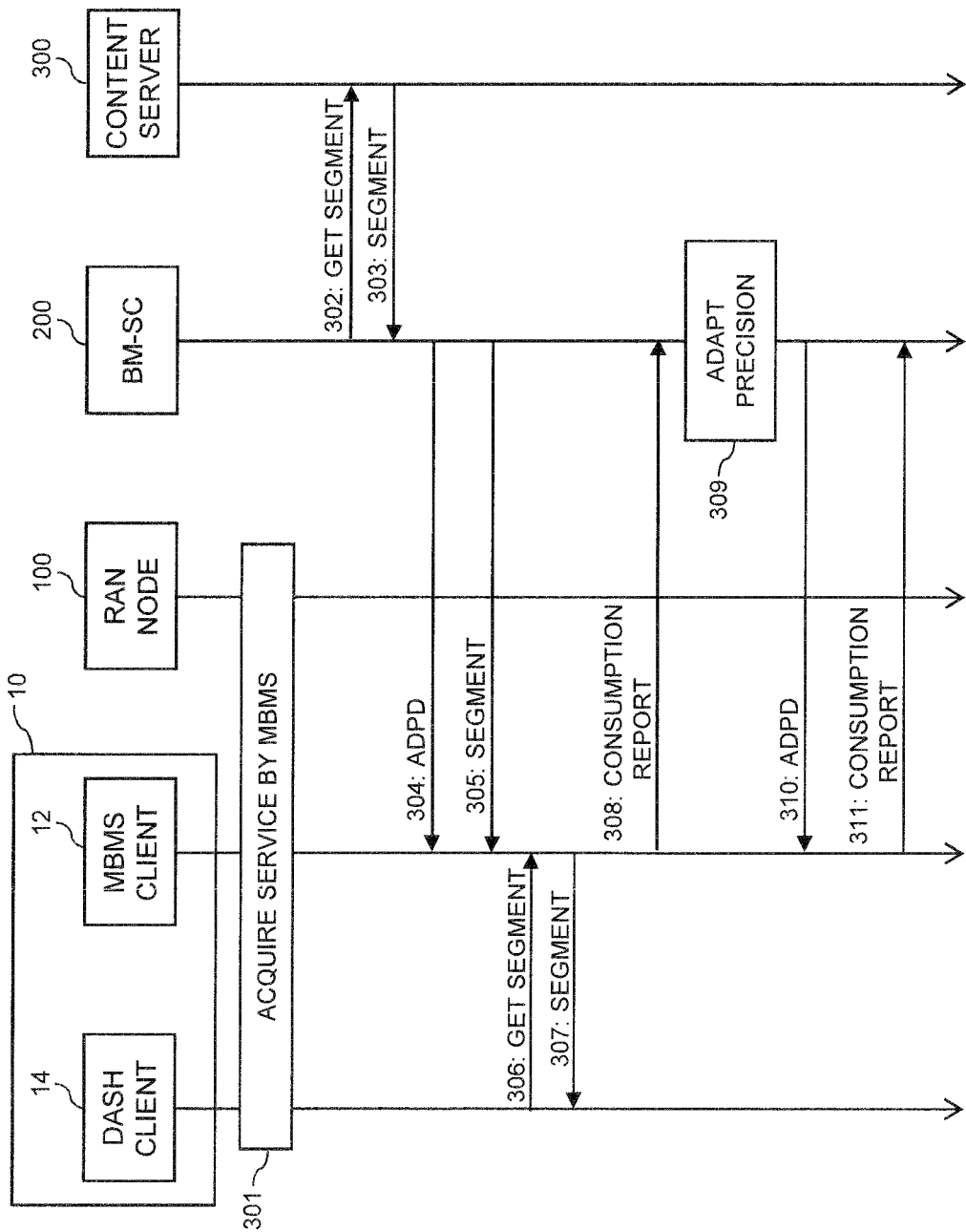
FIG. 3 shows a further example of processes according to an embodiment of the invention.

In the following, delivery of streamed content based in a scenario as illustrated in FIG. 1 will be described in further detail with respect to exemplary processes as illustrated by FIGS. 2 and 3.

In these processes, it is assumed that the streamed content corresponds to multimedia content (e.g., video) streamed according to the DASH (Dynamic Adaptive Streaming over HTTP) technique specified in ISO/IEC 23009-1:2012 (April 2012). However, it is to be understood that corresponding processes could also be applied in connection with other streaming techniques, such as HLS (HTTP Live Streaming).

The processes of FIGS. 2 and 3 involve one of the client devices 10, a RAN (Radio Access Network) node 100, such as an eNB (evolved Node B) of the LTE radio technology, a BM-SC 200, and a content server 300. For supporting the MBMS transmissions, the client device 10 is provided with an MBMS client 12. For supporting the DASH technique, the client device 10 is provided with a DASH client 14. Here, it should be noted that the MBMS client 12 and DASH client 14 are illustrated for representing certain functionalities of the client device 10 and thus do not necessarily correspond to specific hardware structures of the client device 10. In the processes of FIGS. 2 and 3, the configuration information may be sent in ADPD (Associated Delivery Procedure Description) fragments as described in 3GPP TS 26.346, e.g., in one or more elements or attributes defined for this purpose. The ADPD fragments may be provided to the client device 10 through in-band delivery together with MBMS transmissions of the streamed content. Alternatively or in addition, the ADPD fragments may be provided to the client device 10 through unicast mechanisms, e.g., based on a HTTP request/response scheme. The latter option may for example be utilized when the client device 10 is located outside a service area for MBMS transmissions.

In the processes of FIG. 2, unicast delivery of the streamed content is utilized by the client device 10. In an initial stage, the BM-SC 200 sets the precision of consumption reporting, as illustrated by step 201. For example, the BM-SC 200 may initially set a default precision which is the same for service areas and all client devices 10.

As illustrated by 202, the MBMS client 12 of the client device 10 and the BM-SC 200 may then perform a service announcement (SA) procedure. The SA procedure may be used to inform the client device 10 which services are available through MBMS transmissions. In the illustrated example, it is assumed that the client device 10 is informed about the availability of streaming of a certain multimedia content (e.g., a video) by the DASH technique. Further, it is also assumed that the ADPD fragment indicating the configuration information for consumption reporting is initially provided through the SA procedure to the MBMS client 12.

As further illustrated by 203, the RAN node 100 transmits SIB 15 (System Information Block Type 15) to the client device 10, to thereby inform the MBMS client 12 about parameters for receiving the MBMS transmissions in the cell where the client device 10 is currently located. For example, the RAN node 100 may utilize the SIB 15 to indicate a frequency of an MBSFN for the MBMS transmissions.

As further illustrated, the DASH client 14 may then send a request 204 for a Media Presentation Description (MPD) to the MBMS client 12. The request 204 may for example correspond to a HTTP GET message. Based on the information provided through the SA procedure, the MBMS client 12 sends a response 205 with the MPD for the streamed content to the DASH client 14. The response 205 may for example correspond to an HTTP OK message.

The DASH client 14 may then initiate the streaming of the content by sending a request 206 for a first segment of the content to the MBMS client 12. The request 206 may for example correspond to a HTTP GET message.

In accordance with the received configuration information for consumption reporting, the MBMS client 12 then sends a consumption report 207 to the BM-SC 200, thereby indicating that the client device 10 started consumption of the streamed content. The consumption report 207 may be included in a HTTP POST message which is also utilized to inform the BM-SC 200 that the client device 10 will retrieve the streamed content through unicast delivery. The BM-SC 200 then sends a response 208 to the consumption report 207, which may also include a modified version of the ADPD fragment. The response 208 may for example correspond to a HTTP OK message.

Further, the MBMS client 12 sends a request 209 for the first segment of the streamed content to the content server 300. The request 209 may for example correspond to a HTTP GET message. The content server 300 then sends a response 210 with the first segment to the MBMS client 12. The response 210 may for example correspond to a HTTP OK message. The MBMS client 12 then sends a response 211 with the first segment to the DASH client 14. The response 211 may for example correspond to a HTTP OK message.

As further illustrated, the streaming of the content then continues in the unicast delivery mode. Specifically, the DASH client 14 sends a request 212 for a next segment of the content to the MBMS client 12, the MBMS client 12 sends a request 213 for the next segment to the content server 300, the content server 300 sends a response 214 with the next segment to the MBMS client 12, and the MBMS client 12 then sends a response 215 with the next segment to the DASH client 14. Again, the requests 212 and 213 may correspond to HTTP GET messages and the responses 214 and 215 may correspond to HTTP OK messages. It is to be understood that the unicast delivery of the streamed content may be continued in this way by repeating these request/response scheme of requests 212, 213 and responses 214, 215 for following segments of the streamed content.

In the example of FIG. 2, it is assumed that the MBMS client 12 then sends a further consumption report 216 to the BM-SC 200. Again, the consumption report 216 may be included in a HTTP POST message. Having received the consumption report 216, the BM-SC 200 adapts the precision of consumption reporting, as indicated by step 217. This may be accomplished on the basis of information derived from the consumption reports 207 and 216 and also on the basis of consumption reports the BM-SC 200 received from other client devices. Further, the adaptation may be based on information concerning entry or leaving of client devices to/from a service area defined for the delivery of the streamed content, e.g., a cell served by the RAN node 100. The BM-SC 200 then sends a response 218 to the consumption report 216 to the MBMS client 12. The response 218 also includes a modified version of the ADPD fragment, including modified configuration information indicating the adapted precision for consumption reporting. As above, the response 218 may correspond to a HTTP OK message.

The MBMS client 12 then applies the adapted precision while continuing the unicast delivery of the streamed content, as illustrated by requests 219, 220 and responses 221, 222 to retrieve further segments of the streamed content from the content server 300. For example, the MBMS client 12 may send a next consumption report 223 according to a lower or higher frequency of reporting.

In the processes of FIG. 3 multicast delivery of the streamed content based on MBMS transmission is utilized by the client device 10. The processes of FIG. 3 may for example follow the processes of FIG. 2, after switching from the unicast delivery of the streamed content to the multicast delivery of the streamed content.

As illustrated by 301, the client device 10 first acquires the service of streaming the content by MBMS transmissions, e.g., based on information provided through the above-mentioned SA procedure and parameters indicated in the SIB 15. This may also involve joining a multicast session for streaming the content by MBMS transmissions.

The BM-SC 200 then retrieves the segments of the streamed content from the content server 300, by sending a request 302 for a segment to the content server 300 and receiving the segment in a response 303 from the content server 300. The request 302 may be a HTTP GET message, and the response 303 may be a HTTP OK message.

As further illustrated, the BM-SC 200 sends an ADPD fragment 304 and the segment 305 to the MBMS client 12. The ADPD fragment 304 and the segment 305 are in this case both sent as part of the MBMS transmissions utilized for the delivery of the streamed content, i.e., the ADPD fragment is sent "in band". As above, the ADPD fragment 304 includes the configuration information indicating the precision of consumption reporting to be applied by the client device 10.

The DASH client 14 then sends a request 306 for the segment of the content to the MBMS client 12, and the MBMS client 12 sends a response 307 with the segment to the DASH client 14. The request 306 may correspond to a HTTP GET message, and the response 307 may correspond to a HTTP OK message.

The MBMS client 12 then sends a consumption report 308 to the BM-SC 200. The consumption report 308 may be included in a HTTP POST message. Having received the consumption report 308, the BM-SC 200 adapts the precision of consumption reporting, as indicated by step 309. This may be accomplished on the basis of information derived from the consumption report 308 and also on the basis of consumption reports the BM-SC 200 receives from other client devices. Further, the adaptation may be based on information concerning entry or leaving of client devices to/from a service area defined for the delivery of the streamed content, e.g., a cell served by the RAN node 100. The BM-SC 200 then sends a modified ADPD 310 to the MBMS client 12. The modified ADPD fragment 310 includes modified configuration information indicating the adapted precision for consumption reporting. Again, the modified ADPD fragment may be sent in band, as part of the MBMS transmissions.

The MBMS client 12 then applies the adapted precision while continuing reception of the streamed content by the multicast delivery. For example, the MBMS client 12 may send a next consumption report 311 according to a lower or higher frequency of reporting.

It should be noted that as an alternative or in addition to sending the ADPD fragment in band, it could also be sent "out of band", e.g., by using unicast mechanisms, such as a HTTP POST message or the like. The latter case may facilitate individualizing the ADPD fragment (and the adapted precision of consumption reporting), e.g., by sending different ADPDs to different client devices.

As can be seen from the examples of FIGS. 2 and 3, the BM-SC 200 may adapt the precision of consumption reporting while delivery of the streamed content continues. This may be accomplished depending on the consumption reports received by the BM-SC 200, but also depending on other information, such as size of the service area for delivery of the streamed content. In the following, examples of rules which may be applied by the BM-SC 200 when performing the adaptation will be explained in more detail.

As mentioned above, the precision of consumption reporting may be defined by the frequency at which a certain client device sends the consumption reports and the percentage of client devices which shall send the consumption reports, in the following also referred to as "sample percentage". Specifically, the precision may be defined as the reporting frequency multiplied by the sample percentage, i.e., according to:

$$\text{Precision} = \text{Reporting Frequency} \times \text{Sample Percentage} \tag{1}$$

Either one or both of these parameters may be adapted by the BM-SC 200 and indicated to the client device(s).

According to one rule, the frequency of consumption reporting is adapted based on a density of client devices in the service area.

Here, the density may be defined by the number of client devices consuming the same content, either by unicast or broadcast delivery, per area, e.g., according to $$\text{Density} = (\text{number of client devices in service area})/(\text{size of service area}) \tag{2}$$

The density may be applied for accurately controlling the switching between unicast delivery and multicast delivery. For example, when the density increases above a first threshold switching from unicast delivery to multicast delivery may be triggered. Similarly, when the density decreases below a second threshold switching from multicast delivery to unicast delivery may be triggered. To avoid ping-pong like switching due to random fluctuations of the density in the vicinity of the threshold, the second threshold may be lower than the first threshold. However, the first threshold and the second threshold could also be the same. When performing such switching, also the frequency of reporting may be adapted to meet the requirements of the respective delivery mode.

The threshold for triggering the switching may be defined by:

$$\text{Density} = (\text{number of client devices in service area})/(\text{size of service area}) \quad (2)$$

Figure 4:
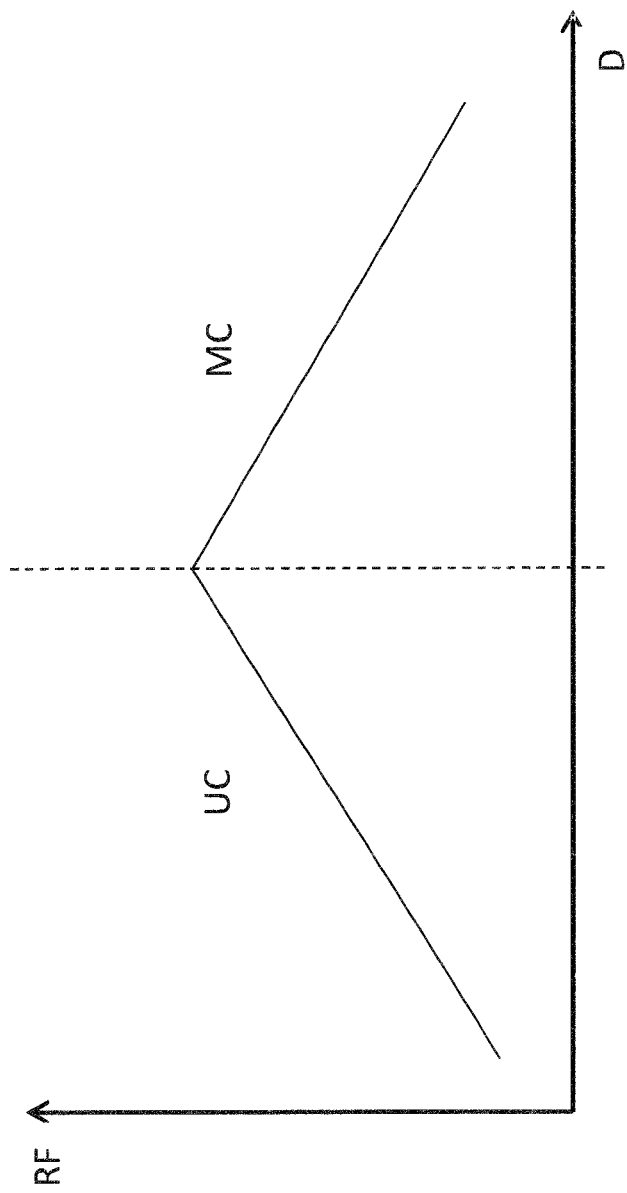
FIG. 4 shows an example of a dependency of a reporting frequency on density of client devices as used in an embodiment of the invention.

FIG. 4 shows an example of how the reporting frequency (RF) may be adapted depending on the density (D). As can be seen, the reporting frequency is adapted to vary depending on a deviation of the density from the threshold density (illustrated by a dashed vertical line) for triggering switching between the unicast delivery (UC) and multicast delivery (MC). Specifically, the reporting frequency is adapted in such a way that the reporting frequency decreases with increasing deviation of the density from the threshold density, i.e., is maximal in vicinity of the threshold density. It should be noted that while FIG. 4 shows the reporting frequency to be a linearly increasing function of the density below the threshold density and a linearly decreasing function of the density above the threshold density, other variation characteristics could be utilized as well, e.g., a parabolic or hyperbolic characteristic having a maximum at the threshold density.

According to a further rule, the sample percentage is adapted based on a size of the service area. In this way, it can be taken into account that with increasing size of the service area, typically a lower sample percentage is needed to estimate the interest in the streamed content in the service area, because a larger service area will typically also include a higher number of client devices so that a lower sample percentage may be sufficient to get a desired (absolute) number of consumption reports.

In this way, it may be taken into account that due to a typically high number of client devices in large service areas, consumption reporting may introduce a high traffic load. This traffic load may also cause processing delays in the BM-SC 200 or other network nodes. On the other hand, a small service area may have a low load due to a typically low number of client devices. By adapting the sampling percentage depending on the size of the service area, the load may be kept in an acceptable range, while also avoiding a risk of reaching only an insufficient number of consumption reports.

A value of the sample percentage which is lower than a default value may for example be appropriate in a large service area where the probability of switching to unicast delivery is very low. In such cases, it is sufficient if only a relatively small proportion of the client devices participates in the consumption reporting, because this small proportion still corresponds to an absolute number of client devices which allows for getting a sufficiently precise understanding of the interest in the streamed content for this service area. Therefore, the sample percentage in a large service area can be lower than in a small service area. As an example, in a stadium with 5000 people (users of client devices), there might be 5000 consumption reports, with a sample percentage of 100%, at the same time. By means of the sample percentage, this number of consumption reports may be reduced to 1500, which is typically sufficient to determine the interest.

In small service areas, a load associated with the consumption reporting can be expected due to a typically low number of client devices in the service area. In such cases, the sample percentage may be kept at the default value or even increased without causing excessive load. By increasing the sample percentage, a better estimation of the interest in the streamed content may be achieved. By way of example, a concert venue with 20 people (users of client devices) may be considered. In this example, there might be 5 consumption reports with a sample percentage of 25%, which typically does not generate a high load. Accordingly, the sample percentage could be increased in order to achieve a better estimation of the interest in the streamed content.

Figure 5:
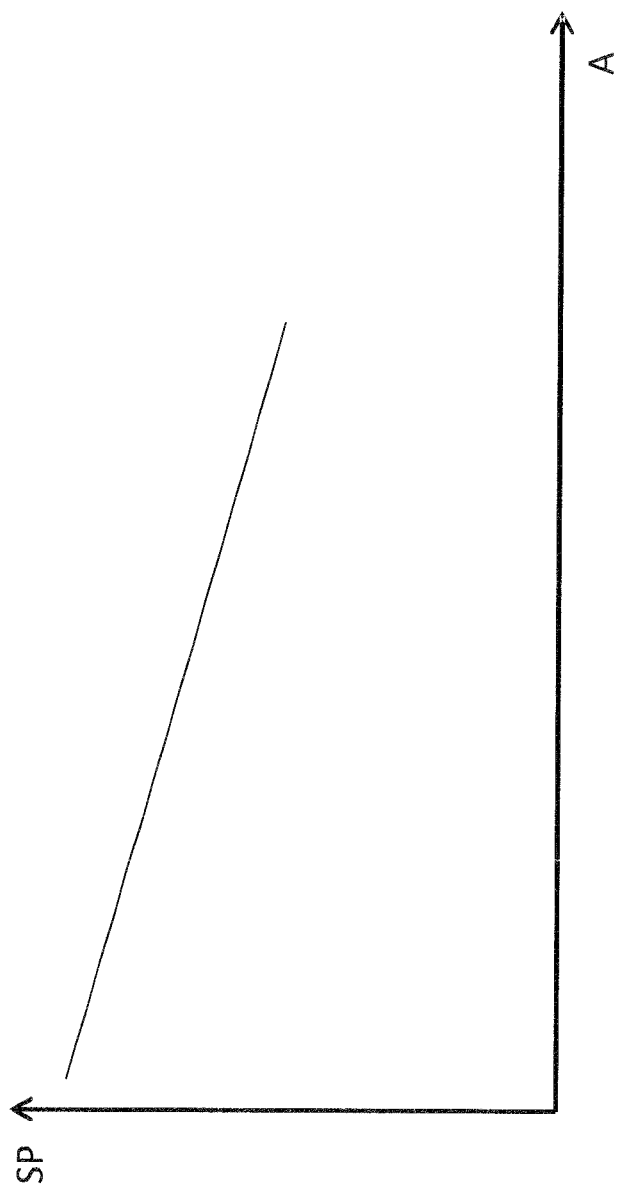
FIG. 5 shows an example of a dependency of a sample percentage of reporting client devices on the size of a service area as used in an embodiment of the invention.

FIG. 5 shows an example of how the sample percentage (SP) may be adapted depending on the size (A) of the service area. As can be seen, the sample percentage decreases as a function of the size of the service area (and expected number of client devices in the service area). It should be noted that while FIG. 5 shows the sample percentage to be a linearly decreasing function of the size (A) of the service area, other variation characteristics could be utilized as well, e.g., a parabolic or exponential characteristic.

In some scenarios, a service area might be geographically large, but be subject to considerable time-dependent or event dependent variations in occupation by client devices. Accordingly, the density of client devices and the load associated with the consumption reporting could change frequently over time. In such a scenario, different cases may be distinguished when adapting the precision:

- A change of precision involving a decrease of the reporting frequency and an increase of the sample percentage. This option may for example be suitable in a small event venue which is only occupied by potential users of client devices during certain events, e.g., a small concert venue such as a bar or club, outside times of events. When there is no event, a lowered reporting frequency may be applied. On the other hand, since there are only few client devices in the service area, an increased sample percentage may be applied.
- An increase of precision involving an increase of both the reporting frequency and sample percentage. This option may for example be suitable in a small event venue which is only occupied by potential users of client devices during certain events, e.g., a small concert venue such as a bar or club, during the time of an event. For example, in the case of a concert venue, people may arrive to watch a concert. When the concert starts, it may be appropriate to switch to broadcast delivery. To avoid missing this point of time, a high reporting frequency is appropriate. On the other hand, since there is only a limited number of client devices; the load associated with consumption reporting is not so high, and the sample percentage may be increased as well.
- A change in precision involving an increase of the reporting frequency and a decrease of the sample percentage. This option may for example be suitable in a bigger event venue which is only occupied by potential users of client devices during certain events, e.g., a bigger concert venue such as a concert arena, at the time when an event is about to start. For example, in the case of a concert arena, a large number of people may arrive to watch a concert. When the concert starts, it may be appropriate to switch to broadcast delivery. To avoid missing this point of time, a high reporting frequency is appropriate. On the other hand, since there is also a large number of client devices; the load associated with consumption reporting may get high, and the sample percentage thus be decreased.
- A decrease of precision involving a decrease of both the reporting frequency and the sample percentage. This option may for example be suitable in an event venue which is only occupied by potential users of client devices during certain events, e.g., a bigger concert venue such as a concert arena, during the time of an event. For example, in a football stadium area during a football game, there are typically a lot of people in the area. Accordingly, there will be a high density of client devices. Accordingly a decreased reporting frequency can be applied. On the other hand, since there is also a large absolute number of client devices, the load associated with consumption reporting may get high, and the sample percentage thus be decreased. As another example, a small concert venue with many people when the concert is finishing may be considered. In this scenario, the people can be expected to slowly leave from the area. Since no abrupt changes of the density of client devices should be expected, a decreased reporting frequency may be applied. Since there may still be a considerable amount of client devices in the area, the sample percentage may be decreased to avoid excessive load.

In the above considerations, the precision applied for consumption reporting is adapted on the network side, e.g., by the BM-SC 200. However, in some scenarios adaptation of the precision may also be additionally or alternatively performed by the client device. For example, the adaptation by the client device may depend on a battery level of the client device or other operating conditions of the client device (e.g., temperature, processor load). For example, if the client device corresponds to a mobile phone or similar portable device and runs out of battery power, the client device may apply a reporting frequency which is reduced as compared to the reporting frequency indicated by the communication network. In order to facilitate consideration of such adaptation on the network side, the client device may indicate in the consumption report that the adapted precision was applied.

Figure 6:
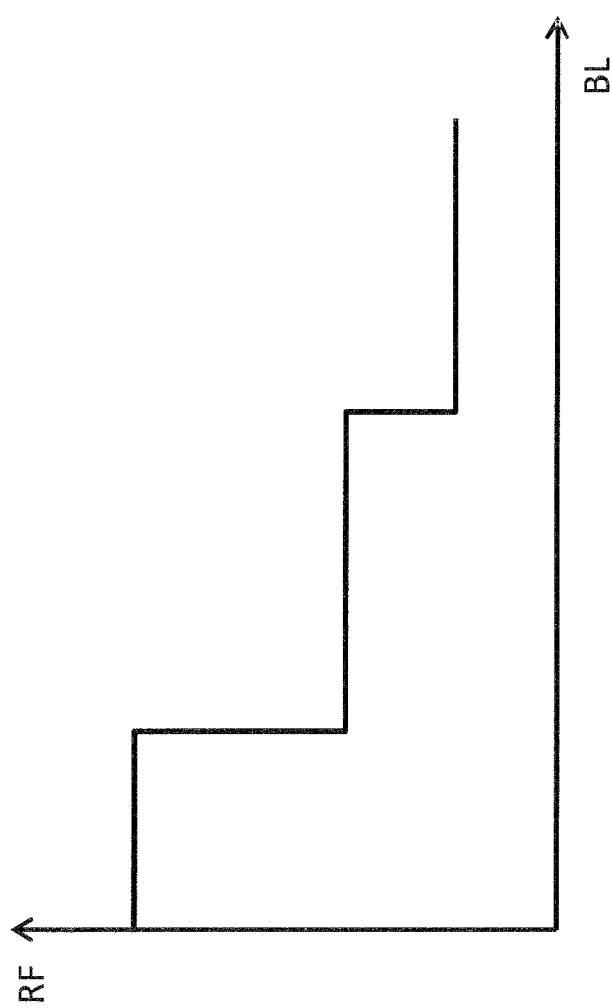
FIG. 6 shows an example of a dependency of a reporting frequency on battery level of a client device as used in an embodiment of the invention.

FIG. 6 shows an example of how the reporting frequency (RF) may be adapted depending on the battery level (BL) of the client device. As can be seen, the reporting frequency decreases as a function of the battery level. In the illustrated example, it is assumed that the reporting frequency decreases in a step-like manner. In this way the possibilities of deviation from the configuration sent by the network are kept limited, and consideration of these deviations when evaluating the consumption reports on the network side is facilitated.

Figure 7:
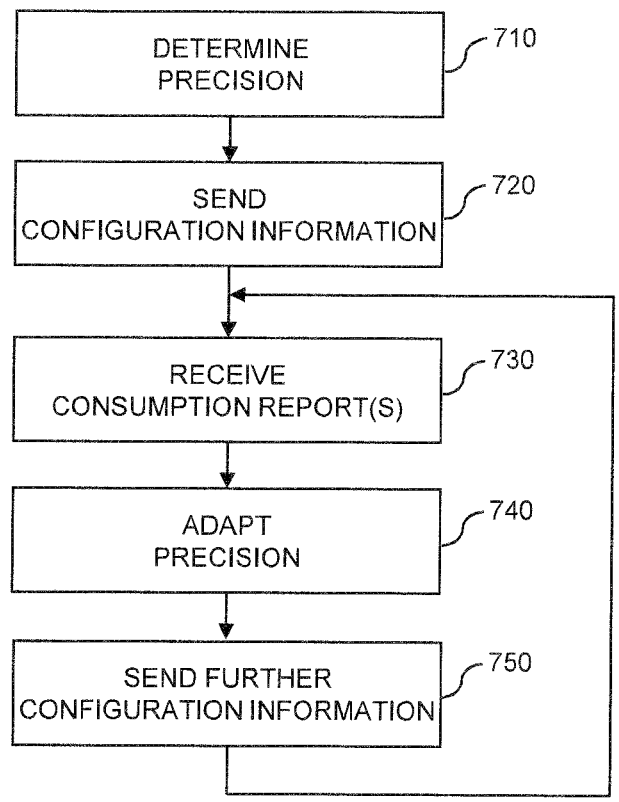
FIG. 7 shows a flowchart for schematically illustrating a method according to an embodiment of the invention.

FIG. 7 shows a flowchart for illustrating a method which may be utilized for implementing the illustrated concepts in a node of a communication network, e.g., the BM-SC 200. The communication network may for example be a cellular radio network supporting transmission of the streamed content by MBMS. If a processor-based implementation of the node is used, the steps of the method may be performed by one or more processors of the node. In such a case the node may further comprise a memory in which program code for implementing the below described functionalities is stored.

At step 710, the node determines a precision to be applied for reporting of consumption of streamed content. The precision may be defined by at least one of a frequency at which a client device sends reports of consumption of the streamed content, i.e., a reporting frequency, and a proportion of the client devices which shall send reports of consumption of the streamed content, i.e., a sample percentage.

At step 720, the node sends configuration information indicating the precision towards a plurality of client devices, e.g., in an ADPD fragment. The configuration information may be sent by unicast transmissions and/or multicast transmissions.

At step 730, the node receives one or more reports of consumption from at least some of the client devices. The reports of consumption may indicate which streamed content is consumed by the client device. The reception of the reports may be organized in collection windows defined in terms of a time interval and/or number of reports. For example, the node may collect the reports until such time interval expires and/or number of reports is reached, before proceeding to further evaluate the reports.

In some scenarios, the received reports of consumption further indicate a configuration as applied by the reporting client device for reporting consumption of the streamed content, e.g., a battery level or an adapted reporting frequency due to an adaptation performed locally by the client device, e.g., as explained in connection with FIG. 6. For example, the client device may apply a lower reporting frequency due to low battery level. The node may utilize such information when statistically evaluating the consumption reports, e.g., by giving a consumption report generated on the basis of such reduced reporting frequency may be assigned a higher statistic weight.

At step 740, the node adapts the precision to be applied for the reporting of consumption of the streamed content. For adapting the precision, the node may estimate a density of client devices receiving the streamed content. This may be accomplished depending on the reports of consumption received at step 730. Depending on the estimated density of client devices, the node may then determine the adapted precision.

Depending on the estimated density of client devices, the node may control switching between transmitting the streamed content in a unicast transmission mode, e.g., based on a HTTP request/response scheme, and transmitting the streamed content in a multicast or broadcast transmission mode, e.g., based on MBMS transmissions.

The switching between transmitting the streamed content in a unicast transmission mode and transmitting the streamed content in a multicast or broadcast transmission mode may depend on a comparison of the determined density of client devices to a switching threshold. The node may then determine the adapted precision as a decreasing function of a deviation or distance of the estimated density from the switching threshold, e.g., as explained in connection with FIG. 4.

Further, the node may determine the adapted precision depending on a size of a service area for transmitting the streamed content, e.g., as explained in connection with FIG. 5. For example, in the case of a larger service area, a lower sample percentage may be applied. Similarly, in the case of a smaller service area, a higher sample percentage may be applied. Further, the node may determine the adapted precision also depending on a number of client devices in the service area.

At step 750, the node sends further configuration information indicating the adapted precision towards the client devices, e.g., in an ADPD fragment. The further configuration information and the adapted precision may differ between at least some of the plurality of client devices. For example, the further configuration information and the adapted precision may vary from one service area to another service area for delivery of the streamed content. In some cases, the configuration information may even differ between client devices in the same service area, e.g. depending on a device category.

The node may then return to step 730 to receive further reports of consumption.

In some scenarios, the node may send the further configuration information in a response to one of the reports of consumption, e.g., as shown in the example of FIG. 2. However, also other mechanisms may be used for sending the further configuration information, e.g., in band delivery together with multicast transmissions for delivering the streamed content.

Accordingly, a node which operates according to the method of FIG. 7 may be provided with a module configured to determine a precision for reporting of consumption of streamed content, such as explained in connection with step 710, a module configured to send configuration information indicating the precision to a plurality of client devices, such as explained in connection with step 720, a module configured to receive one or more reports of consumption from at least some of the client devices, such as explained in connection with step 730, a module configured to adapt the precision after receiving the one or more reports, such as explained in connection with step 740, and a module configured to send further configuration information indicating the adapted precision to at least some of the plurality of client devices, such as explained in connection with step 750. It should be understood that the node may also include further modules for implementing other functionalities as described above, such as functionalities for sending segments of the streamed content by multicast transmissions or unicast transmissions. Further, it should be understood that the modules of the node do not necessarily represent a hardware structure of the server, but may also correspond to functional elements, e.g., implemented by hardware, software, or a combination thereof.

Figure 8:
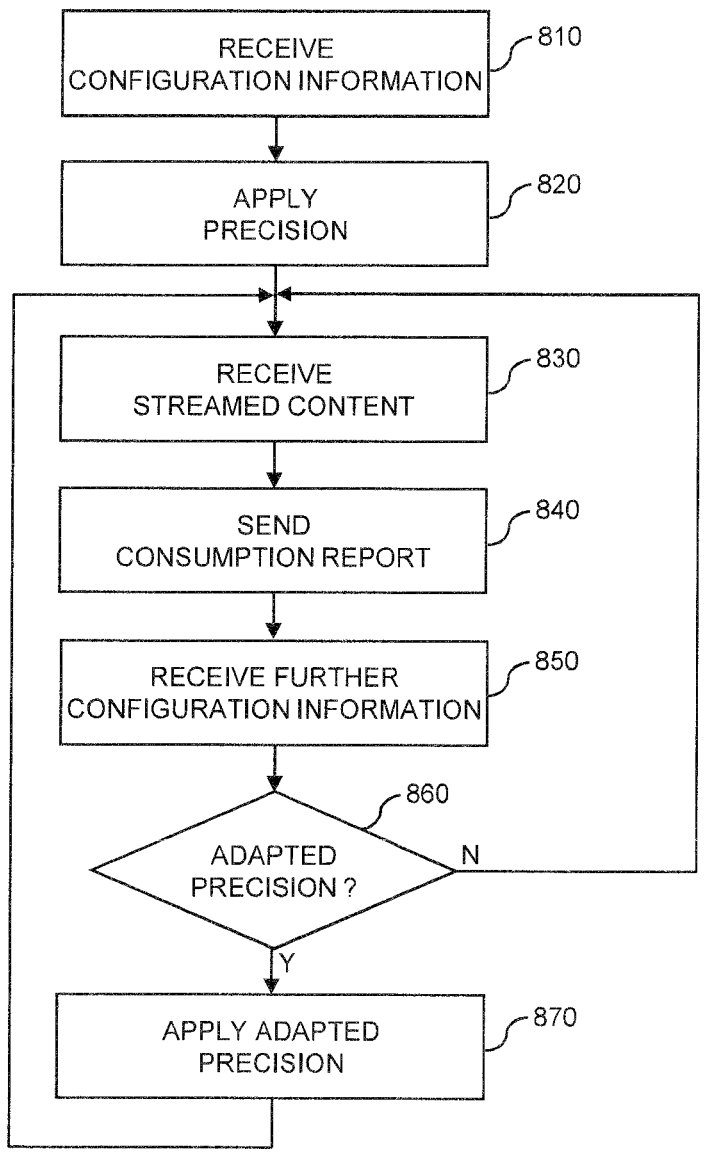
FIG. 8 shows a flowchart for schematically illustrating a further method according to an embodiment of the invention.

FIG. 8 shows a flowchart for illustrating a method which may be utilized for implementing the illustrated concepts in a client device, e.g., the client device 10. If a processor-based implementation of the client device is used, the steps of the method may be performed by one or more processors of the client device. In such a case the client device may further comprise a memory in which program code for implementing the below described functionalities is stored.

At step 810, the client device receives configuration information indicating a precision to be applied for reporting of consumption of streamed content, e.g., in an ADPD fragment. As indicated by step 820, the client device may then apply the precision when reporting consumption of the streamed content. The precision may be defined by at least one of a frequency at which a client device sends reports of consumption of the streamed content, i.e., a reporting frequency, and a proportion of the client devices which shall send reports of consumption of the streamed content, i.e., a sample percentage.

At step 830, the client device receives the streamed content. The streamed content may be received in a unicast transmission mode, e.g., based on a HTTP request/response scheme, or in a multicast or broadcast transmission mode, e.g., based on MBMS transmissions.

At step 840, the client device sends one or more reports of consumption of the streamed content in accordance with the indicated precision. The reports of consumption may indicate which streamed content is consumed by the client device.

In some scenarios, the received reports of consumption further indicate a configuration as applied by the reporting client device for reporting consumption of the streamed content, e.g., a battery level or an adapted reporting frequency due to an adaptation performed locally by the client device, e.g., as explained in connection with FIG. 6. For example, the client device may adapt the precision, e.g., by applying a lower reporting frequency due to low battery level. The communication network may utilize such information when statistically evaluating the consumption reports, e.g., by giving a consumption report generated on the basis of such reduced reporting frequency may be assigned a higher statistic weight.

At step 850, the client device receives further configuration information, e.g., in an ADPD fragment. In some scenarios, the node may receive the further configuration information in a response to one of the reports of consumption, e.g., as shown in the example of FIG. 2. However, also other mechanisms may be used for receiving the further configuration information, e.g., in band delivery together with multicast transmissions for delivering the streamed content.

Depending on an identity of the client device, e.g., a network address, the client device may identify the further configuration information as being intended to be applied by the client device. Alternatively or in addition, the client device may identify depending on a service area in which the client device is located, that the further configuration information is intended to be applied by the client device. For example, an individualized ADPD fragment including the configuration information may be addressed by unicast or multicast transmissions to the client device. Further, an ADPD fragment could include multiple sets of configuration information, and the client device may select the configuration information to be applied depending on its identity or depending on the service area in which the client device is currently located.

At step 860, the client device may check if this further configuration information indicates an adapted precision to be applied for reporting of consumption of the streamed content. If this is the case, the client device may proceed to step 870, as indicated by branch "Y", and apply the adapted precision. Having applied the adapted precision, the client device may continue to receive the streamed content and send one or more reports of consumption of the streamed content in accordance with the indicated adapted precision, by returning to step 830.

If the further configuration information does not indicate an adapted precision, the client device may return directly to step 830 and continue to receive the streamed content and send one or more reports of consumption of the streamed content in accordance with the previously indicated precision.

In some scenarios, the adapted precision depends on a density of client devices estimated based on the reports of consumption sent by the client device. Depending on such density, switching between transmitting the streamed content in a unicast transmission mode, e.g., based on a HTTP request/response scheme, and transmitting the streamed content in a multicast or broadcast transmission mode, e.g., based on MBMS transmissions, may be controlled.

The switching between transmitting the streamed content in a unicast transmission mode and transmitting the streamed content in a multicast or broadcast transmission mode may depend on a comparison of the determined density of client devices to a switching threshold. The adapted precision may then be a decreasing function of a deviation or distance of the estimated density from the switching threshold, e.g., as explained in connection with FIG. 4. Further, the adapted precision may depend on a size of a service area for transmitting the streamed content, e.g., as explained in connection with FIG. 5. For example, in the case of a larger service area, a lower sample percentage may be applied. Similarly, in the case of a smaller service area, a higher sample percentage may be applied. Further, the adapted precision may also depend on a number of client devices in the service area.

Accordingly, a client device which operates according to the method of FIG. 8 may be provided with a module configured to receive configuration information indicating a precision to be applied for reporting of consumption of streamed content, such as explained in connection with steps 810 and 820, a module configured to receive the streamed content and send one or more reports of consumption of the streamed content in accordance with the indicated precision, such as explained in connection with steps 830 and 840, a module configured to receive further configuration information indicating an adapted precision to be applied for reporting of consumption of the streamed content and continue to receive the streamed content and send one or more reports of consumption of the streamed content in accordance with the indicated adapted precision, such as explained in connection with steps 850, 860, and 870.

It is to be understood that the methods of FIGS. 7 and 8 may also be combined in a system which includes a node operating according to the method of FIG. 7 and one or more client devices operating according to the method of FIG. 8.

Figure 9:
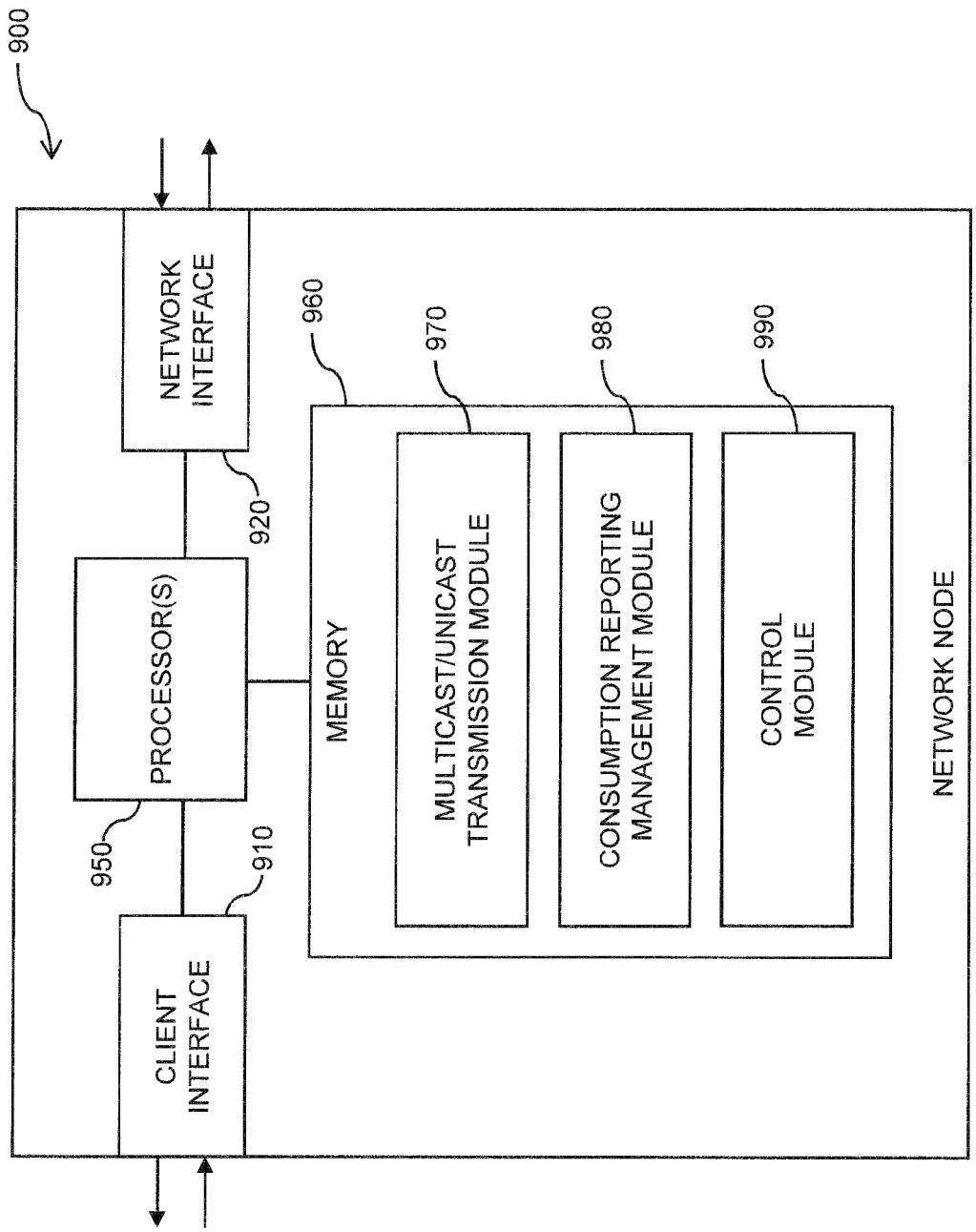
FIG. 9 schematically illustrates a network node according to an embodiment of the invention.

FIG. 9 illustrates exemplary structures which may be used for implementing the above concepts in a node 900 of a communication network which is responsible for controlling streaming of content, e.g., the BM-SC 200.

As illustrated, the node 900 may include a client interface 910, through which one or more client devices may be connected to the node 900. In accordance with the illustrated concepts, the client interface 910 is assumed to support at least the multicast transmission mode, e.g., based on MBMS transmissions. Further, the node 900 may include a network interface 920, e.g., for receiving the streamed content from an external source, such as the content server 300.

Further, the node 900 may include one or more processors 950 coupled to the interfaces 910, 920, and a memory 960 coupled to the processor(s) 950. The memory 960 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 960 includes suitably configured program code to be executed by the processor(s) 950 so as to implement the above-described functionalities of the node. In particular, the memory 960 may include various program code modules for causing the node 900 to perform processes as described above, e.g., corresponding to the method steps of FIG. 7.

As illustrated, the memory 960 may include a multicast/unicast transmission module 970 for implementing the above-described functionalities of performing multicast and unicast transmissions, such as transmitting segments of streamed content in the multicast transmission mode or transmitting configuration information in the unicast or multicast transmission mode. Further, the memory 960 may also include a consumption reporting management module 980 for implementing the above-described functionalities of determining the precision and evaluating the received reports. Further, the memory 960 may include a control module 990 for implementing the above-described functionalities of controlling switching between unicast delivery and multicast delivery.

It is to be understood that the structures as illustrated in FIG. 9 are merely schematic and that the node 900 may actually include further components which, for the sake of clarity, have not been illustrated, e.g., further interfaces or processors. Also, it is to be understood that the memory 960 may include further types of program code modules, which have not been illustrated, e.g., program code modules for implementing known functionalities of a BM-SC, such as processing of data according to MBMS protocols. According to some embodiments, also a computer program may be provided for implementing functionalities of the node 900, e.g., in the form of a physical medium storing the program code and/or other data to be stored in the memory 960 or by making the program code available for download or by streaming.

Figure 10:
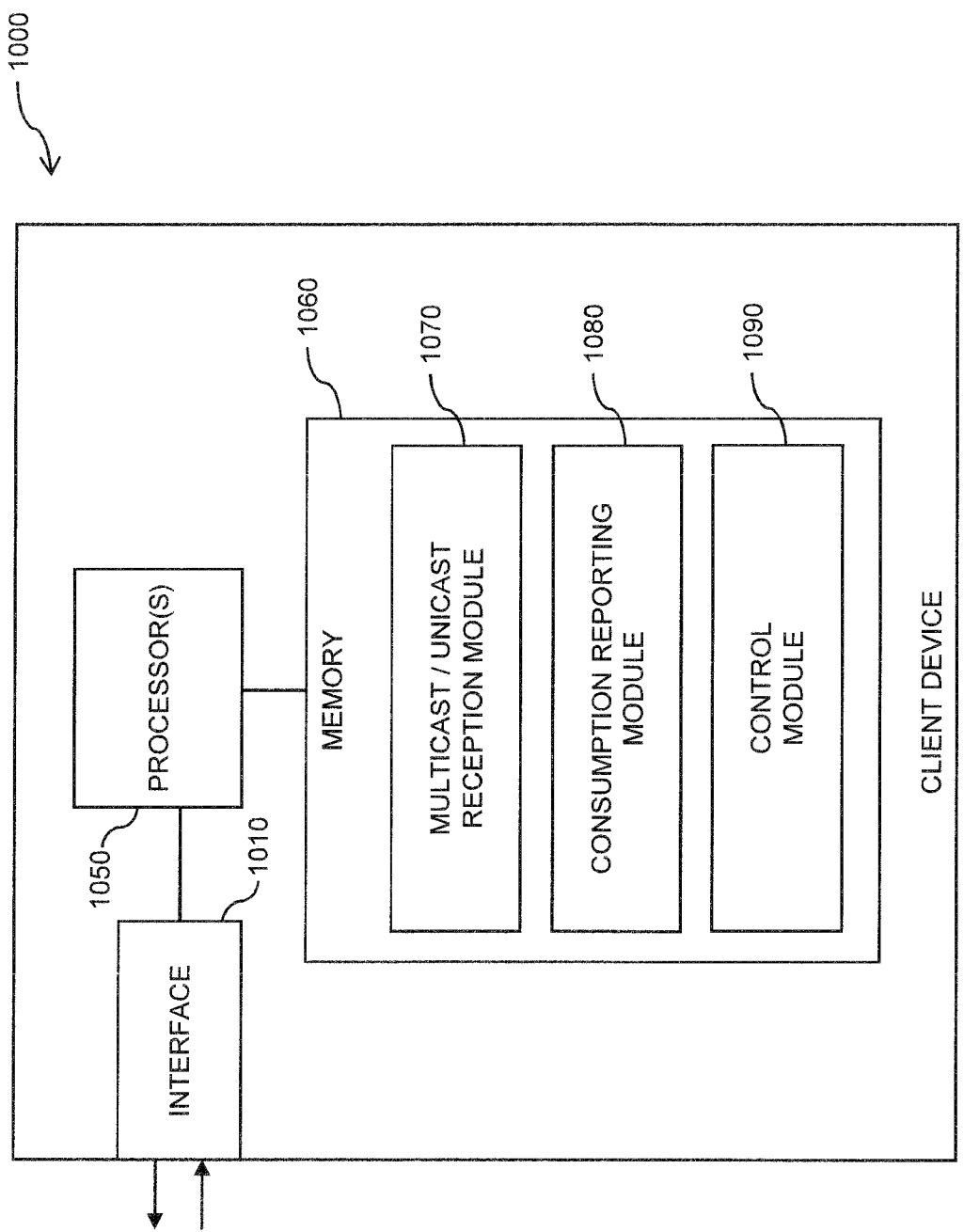
FIG. 10 schematically illustrates a client device according to an embodiment of the invention.

FIG. 10 illustrates exemplary structures which may be used for implementing the above concepts in a client device 1000, such as the client device 10. The client device 1000 may for example correspond to a mobile phone or to some other type of portable or stationary computing device.

As illustrated, the client device 1000 may include an interface 1010 for enabling access of the client device 1000 to the communication network. The interface 1010 may correspond to a radio interface. Further, the client device 1000 may include one or more processors 1050 coupled to the interface 1010, and a memory 1060 coupled to the processor(s) 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code to be executed by the processor(s) 1050 so as to implement the above-described functionalities of a client device. In particular, the memory 1060 may include various program code modules for causing the client device 1000 to perform processes as described above, e.g., corresponding to the method steps of FIG. 8.

As illustrated, the memory 1060 may include a multicast/unicast reception module 1070 for implementing the above-described functionalities of receiving streamed content in the multicast transmission mode or unicast transmission mode, receiving configuration information, and sending consumption reports. Further, the memory 1060 may include a consumption reporting module 1080 for implementing the above-described functionalities of generating consumption reports according to the received configuration information. Further, the memory 1060 may also include a control module 1090 for implementing the above-described functionalities of switching between unicast delivery and multicast delivery (e.g., by selecting a corresponding reception mode).

It is to be understood that the structures as illustrated in FIG. 10 are merely schematic and that the client device 1000 may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of a client device, e.g., functionalities of a UE for an LTE cellular network or known functionalities of a streaming client. According to some embodiments, also a computer program may be provided for implementing functionalities of the client device 1000, e.g., in the form of a physical medium storing the program code and/or other data to be stored in the memory 1060 or by making the program code available for download or by streaming.

As can be seen, the concepts as described above may be used for efficiently streaming content in a communication network. Specifically, the concepts may be used to optimize consumption reporting with respect to the associated load on processing or radio resources. Further, on the client device side, a lower battery drain may be achieved by avoiding excessive sending of consumption reports. Further, switching between the unicast delivery and multicast delivery may be controlled more accurately, which allows a more efficient usage of radio resources for the streaming of content.

It is to be understood that the examples and embodiments as explained above are merely illustrative and susceptible to various modifications. For example, the illustrated concepts may be applied in connection with various communication network technologies. Further, the illustrated concepts may be applied in connection with various kinds of streaming technologies and content types. Moreover, it is to be understood that the above concepts may be implemented by using correspondingly designed software to be executed by one or more processors of an existing device, or by using dedicated device hardware. Further, it should be noted that the illustrated client device and server may each be implemented as a single device or as a system of multiple interacting devices.

The invention claimed is:

1. A method of streaming content, the method comprising: determining, by a Broadcast Multicast Service Centre (BM-SC) node of a communication network, a precision to be applied for reporting of consumption of streamed content by a plurality of client devices connected to the communication network; sending, by the BM-SC node, configuration information indicating the precision towards the plurality of client devices connected to the communication network; receiving, by the BM-SC node, reports of consumption of the streamed content from at least some of the plurality of client devices connected to the communication network; estimating, by the BM-SC node, a density of client devices connected to the communication network receiving the streamed content depending on the received reports of consumption; controlling, by the BM-SC node, switching between transmitting the streamed content in a unicast transmission mode and transmitting the streamed content in a multicast or broadcast transmission mode depending on the estimated density of client devices connected to the communication network; adapting, by the BM-SC node, the precision to be applied for said reporting of consumption of the streamed content based on the estimated density of client devices connected to the communication network; and sending, by the BM-SC node, further configuration information indicating the adapted precision towards the plurality of client devices connected to the communication network, wherein the precision is defined by a frequency at which a client device connected to the communication network sends the reports of consumption of the streamed content and a proportion of the plurality of client devices connected to the communication network that send the reports of consumption of the streamed content to the BM-SC node of the communication network.

2. The method of claim 1, wherein the switching between transmitting the streamed content in the unicast transmission mode and transmitting the streamed content in the multicast or broadcast transmission mode depends on a comparison of the estimated density of client devices connected to the communication network to a switching threshold, and
wherein the adapted precision is determined as a decreasing function of a deviation of the estimated density of client devices connected to the communication network to the switching threshold.

3. The method of claim 1, further comprising:
determining, by the BM-SC node, the adapted precision depending on a size of a service area for transmitting the streamed content.

4. The method of claim 1, wherein the received reports of consumption further indicate a configuration as applied by the reporting client device connected to the communication network for said reporting of consumption of the streamed content.

5. The method of claim 1, wherein the further configuration information and the adapted precision differ between at least some of the plurality of client devices connected to the communication network.

6. The method of claim 1, further comprising:
sending, by the BM-SC node, the further configuration information in a response to one of the reports of consumption.

7. A computer program product comprising a non-transitory computer readable medium storing computer program comprising program code to be executed by at least one processor of a Broadcast Multicast Service Centre (BM-SC) node of a communication network, wherein execution of the program code causes the BM-SC node to perform the method of claim 1.

8. A method of streaming content, the method comprising: receiving, by a client device connected to a communication network, configuration information indicating a precision to be applied for reporting of consumption of streamed content; receiving, by the client device connected to the communication network, the streamed content and sending, by the client device connected to the communication network, one or more reports of consumption of the streamed content in accordance with the indicated precision; receiving, by the client device connected to the communication network, further configuration information indicating an adapted precision to be applied for reporting of consumption of the streamed content, the adapted precision being dependent on a density of client devices connected to the communication network estimated based on the one or more reports of consumption sent by the client device connected to the communication network, wherein the streamed content is received in a unicast transmission mode or in a multicast or broadcast transmission mode, and wherein switching between the unicast transmission mode and the multicast or broadcast transmission mode is controlled depending on the estimated density of client devices connected to the communication network; and continuing to receive, by the client device connected to the communication network, the streamed content and sending, by the client device connected to the communication network, one or more reports of consumption of the streamed content in accordance with the indicated adapted precision, wherein the precision is defined by a frequency at which the client device connected to the communication network sends the one or more reports of consumption of the streamed content and a proportion of client devices connected to the communication network that send the one or more reports of consumption of the streamed content to a Broadcast Multicast Service Centre (BM-SC) node of the communication network.

9. The method of claim 8, further comprising:
depending on an identity of the client device connected to the communication network, identifying, by the client device connected to the communication network, the further configuration information as being intended to be applied by the client device connected to the communication network.

10. The method of claim 8, further comprising:
depending on a service area in which the client device connected to the communication network is located, identifying, by the client device connected to the communication network, the further configuration information as being intended to be applied by the client device connected to the communication network.

11. The method of claim 8, wherein the switching between the unicast transmission mode and the multicast or broadcast transmission mode depends on a comparison of the estimated density of client devices connected to the communication network to a switching threshold, and
wherein the adapted precision is a decreasing function of a deviation of the estimated density of client devices connected to the communication network to the switching threshold.

12. The method of claim 8, wherein the adapted precision depends on a size of a service area for transmitting the streamed content.

13. The method of claim 8, wherein the one or more reports of consumption sent by the client device connected to the communication network further indicate a configuration as applied by the client device connected to the communication network for said reporting of consumption of the streamed content.

14. A computer program product comprising a non-transitory computer readable medium storing computer program code comprising program code to be executed by at least one processor of a client device connected to a communication network, wherein execution of the program code causes the client device connected to the communication network to perform the method of claim 8.

15. A Broadcast Multicast Service Centre (BM-SC) node for a communication network, the BM-SC node being configured to: determine a precision to be applied for reporting of consumption of streamed content; send configuration information indicating the precision towards a plurality of client devices connected to the communication network; receive reports of consumption of the streamed content from at least some of the plurality of client devices connected to the communication network; estimate a density of client devices connected to the communication network receiving the streamed content depending on the received reports of consumption; control switching between transmitting the streamed content in a unicast transmission mode and transmitting the streamed content in a multicast or broadcast transmission mode depending on the estimated density of client devices connected to the communication network; adapt the precision to be applied for said reporting of consumption of the streamed content after receiving the reports of consumption based on the estimated density of client devices connected to the communication network; and send further configuration information indicating the adapted precision towards the plurality of client devices connected to the communication network, wherein the precision is defined by a frequency at which a client device connected to the communication network sends the reports of consumption of the streamed content and a proportion of the plurality of client devices connected to the communication network that send the reports of consumption of the streamed content to the BM-SC node of the communication network.

16. A client device connected to a communication network, the client device being configured to: receive configuration information indicating a precision to be applied for reporting of consumption of streamed content; receive the streamed content and send one or more reports of consumption of the streamed content in accordance with the indicated precision; receive further configuration information indicating an adapted precision to be applied for reporting of consumption of the streamed content, the adapted precision being dependent on a density of client devices connected to the communication network estimated based on the one or more reports of consumption sent by the client device connected to the communication network, wherein the streamed content is received in a unicast transmission mode or in a multicast or broadcast transmission mode, and wherein switching between the unicast transmission mode and the multicast or broadcast transmission mode is controlled depending on the estimated density of client devices connected to the communication network; and continue to receive the streamed content and send one or more reports of consumption of the streamed content in accordance with the indicated adapted precision, wherein the precision is defined by a frequency at which the client device connected to the communication network sends the one or more reports of consumption of the streamed content and a proportion of client devices connected to the communication network that send the one or more reports of consumption of the streamed content to a Broadcast Multicast Service Centre (BM-SC) node of the communication network.

* * * * *